(12) United States Patent
Ducato

(10) Patent No.: US 7,633,638 B2
(45) Date of Patent: Dec. 15, 2009

(54) METHOD AND SYSTEM FOR DATA PROCESSING

(75) Inventor: Jose La Rosa Ducato, Erding (DE)

(73) Assignee: Oce Printing Systems GmbH, Poing (DE)

( * ) Notice: Subject to any disclaimer, the term of this patent is extended or adjusted under 35 U.S.C. 154(b) by 899 days.

(21) Appl. No.: 10/240,055

(22) PCT Filed: Apr. 10, 2001

(86) PCT No.: PCT/EP01/04556

§ 371 (c)(1),
(2), (4) Date: Mar. 31, 2003

(87) PCT Pub. No.: WO01/77807

PCT Pub. Date: Oct. 18, 2001

(65) Prior Publication Data

US 2004/0036902 A1 Feb. 26, 2004

(30) Foreign Application Priority Data

Apr. 10, 2000 (DE) .............................. 100 17 785

(51) Int. Cl.
G06F 3/12 (2006.01)

(52) U.S. Cl. ................. 358/1.15; 358/1.13; 358/1.18; 358/1.6; 715/243; 715/274; 715/523; 707/100

(58) Field of Classification Search .............. 358/1.15, 358/1.13, 1.6, 1.18; 707/100; 715/523, 243, 715/274

See application file for complete search history.

(56) References Cited

U.S. PATENT DOCUMENTS 4,209,845 A 6/1980 Berger et al.
5,175,691 A * 12/1992 Baker et al. .................. 700/220
5,187,750 A 2/1993 Behera
5,546,577 A * 8/1996 Marlin et al. ............ 707/103 R
5,583,970 A * 12/1996 Strobel ....................... 358/1.15
5,613,110 A 3/1997 Stuart
5,680,615 A 10/1997 Marlin et al.
5,727,220 A 3/1998 Hohensee et al.
5,768,488 A 6/1998 Stone et al.
5,778,377 A * 7/1998 Marlin et al. ............ 707/103 R
5,867,636 A 2/1999 Walker (Continued)

FOREIGN PATENT DOCUMENTS

WO WO 00/68877 11/2000

OTHER PUBLICATIONS

IBM, "Adanced Function Presentation Conversion and Indexing Family: Application Programming Guide", Apr. 1993, IBM, First Edition, IBM Order No. G544-3824.*

(Continued)

*Primary Examiner*—Twyler L Haskins
*Assistant Examiner*—Jacky X Zheng
(74) *Attorney, Agent, or Firm*—Schiff Hardin LLP

(57) ABSTRACT

A method, system and computer program for processing print data provides that the print data is normalized, or converted, from a first format to a second normalized format, The print data stream in the normalized format is indexed and the indexed data stream is sorted by a predetermined sort parameter. The sorted print data stream is then outputted.

22 Claims, 8 Drawing Sheets

U.S. PATENT DOCUMENTS

| | | | |
|---|---|---|---|
| 6,020,970 | A | 2/2000 | Erickson et al. |
| 6,125,760 | A * | 10/2000 | Graushar et al. ............ 101/490 |
| 6,337,743 | B1 * | 1/2002 | Brown et al. ............... 358/1.13 |
| 6,370,259 | B1 * | 4/2002 | Hobson et al. .............. 382/101 |
| 6,384,931 | B1 * | 5/2002 | Brown et al. ............... 358/1.18 |
| 6,995,853 | B1 * | 2/2006 | Bratsanos et al. .......... 358/1.15 |
| 7,058,614 | B1 * | 6/2006 | Wesseling et al. ........... 705/408 |

OTHER PUBLICATIONS

R. K. deBry, M. W. Munger, "Advanced Function Printing—From Print to Presentation", IBM System Journal, vol. 32, No. 4, 1993, disclose some IBM products using AFP architecture and possible future directions for AFP.*

R. J. Howarth, B. G. Platte, "The Continuing Evolution of Advanced Function Printing", IBM System Journal, vol. 32, No. 4.*

R. J. Howarth, B. G. Platte, "The Continuing Evolution of Advanced Function Printing", IBM System Journal, vol. 32, No. 4, 1993.*

Advanced Function Presentation, "Conversion and Indexing Facility Application Programming Guide", IBM, Apr. 1993.

IBM publication 2-544-3884-02, pp. v-viii, 1-26, 37-45, 65-78 and 135-149, Oct. 2000.

The World of Printers—Print Server—M. Mertgen prepared by G. Goldmann—pp. 12-1-1208, Oct. 1999.

* cited by examiner

METHOD AND SYSTEM FOR DATA PROCESSING

BACKGROUND OF THE INVENTION

1. Field of the Invention

The present invention relates generally to a method and a system for data processing. In particular, it is directed to a method and a system for processing a print data stream that is edited for output to a printer device.

2. Description of the Related Art

Editing of a print data stream typically occurs in computers that process print data files or print data from user programs in a printer-adapted fashion. The print data is converted, for example, into an output stream of a specific print data language such as AFP® (Advanced Function Presentation), PCL or PostScript.

The print data in large computing centers is typically compiled (referred to as a spooling event) in a host computer (such as a main frame computer) and print jobs are generated therefrom that are adapted for output to high-performance printing systems such that the high-performance printing systems can have optimum time usage in the production operations. They can thereby be largely utilized in continuous operation.

Such high-performance printers with printing speeds from about 40 DIN A4 pages per minute up to more than 1000 DIN A4 pages per minute are described, for, in the publication "Das Druckerbuch", edited by Dr. Gerd Goldmann (Océ Printing Systems GmbH), Edition 4C, October 1999, ISBN 3-000-00 1019-X. Chapter 12 of this publication (pages 12-1 through 12-18) of this publication describe the server system known by the name of PRISMA PRO® that serves for editing print data streams in production printing environments.

The AFP format (Advanced Function Presentation) is a typical print data format in electronic production printing environments, this being described, for example, in the publication number S-544-3884-01 of International Business Machines Corp. (IBM) bearing the title "AFP Programming Guide and Line Data Reference." This publication also describes the specification for a further data stream having the designation "S/370 Line-Mode Data". The print data stream AFP was developed further into the print data stream MO:DCA that is described in the IBM publication SC31-6802-04 bearing the title "Mixed Object Document Content Architecture Reference". Details of this data stream, particularly the employment of structured fields, are disclosed by U.S. Pat. No. 5,768,488.

The assignee markets a spooling system for high-performance printing systems under the trademark SPS that is in the position of processing a plurality of different print data streams from different applications, of spooling under different operating systems such as MVS or BS 2000 and converting into a device-oriented data stream such as, for example, IPDS (Intelligent Printer Data Stream).

IBM has created the program known as ACIF with which it is possible to convert and index streams. The ACIF application is described in the IBM brochure G544-3824-00 bearing the title "Conversion and indexing facility application programming guide" as well as in the IBM brochure number S544-5285-00 bearing the title "AFP conversion and indexing facility (ACIF) user's guide".

U.S. Pat. No. 5,727,220 and U.S. Pat. No. 5,680,615 disclose methods and systems wherein interrelated objects of a document are processed via a structured data stream such as MO:DCA or IPDS.

U.S. Pat. No. 4,209,845 discloses a system with which print data can be sorted. U.S. Pat. No. 5,613,110 discloses a method for indexing data. U.S. Pat. No. 5,187,750 discloses an archiving system with which printed originals to be archived can be opto-electronically scanned and durably stored in a long-term store such as magnetic tapes or optical storage elements (for example, on a CD-ROM).

The International Patent Application WO-A1-00/68877 filed by the assignee discloses a method and a system with which print data can be edited in a logical page sequence corresponding to a signature for printing in what is referred to as an imposition procedure.

The contents of the above-cited publications and patent applications are herewith incorporated by reference into the present specification.

When outputting print data in high-speed printing applications that are employed, for example, in computer centers or, too, in printing centers for what is referred to as the PoD (Printing on Demand) application, the print data is specifically edited so that is can be processed as fast as possible in the print production environment and ultimately transfer-printed on the recording medium. The data editing thereby mainly ensues in view thereof that the print output meet certain presentation demands of the final consumer (reader of the printed information). Further, users of print data processing programs normally want to assess the generated print data before these are actually printed. In addition to programs that already present the print data in the way it is printed (what are referred to as "what you see is what you get", WYSIWYG programs), what are referred to as viewing and navigating programs (or, respectively, browsers) are also utilized that enable not only the advance checking of the printer result but also the targeted locating of information on the basis of indexed objects. Such an indexed navigation possibility is advantageous particularly given print processing programs in the aforementioned production environment wherein the print jobs may be extremely large and can comprise several thousand pages. A corresponding program with the name "AFP Workbench for Windows" has been disclosed by IBM.

SUMMARY OF THE INVENTION

The present invention provides a method and a system that enables the print data to be prescribed variably and user-specifically in a print production system.

Inventively, a print data stream arriving or, respectively, present in a first print data format is converted into a normed print data stream and the print data stream converted in this way is indexed on the basis of prescribed indexing criteria. The indexed print data stream is then sorted in a sorting sequence by means of prescribed sorting parameters, and the sorted print data stream is output for further processing, particularly for the printout.

BRIEF DESCRIPTION OF THE DRAWINGS

Exemplary embodiments and further advantages of the invention are described below on the basis of the following Figures.

DETAILED DESCRIPTION OF THE PREFERRED EMBODIMENTS

Figure 1:
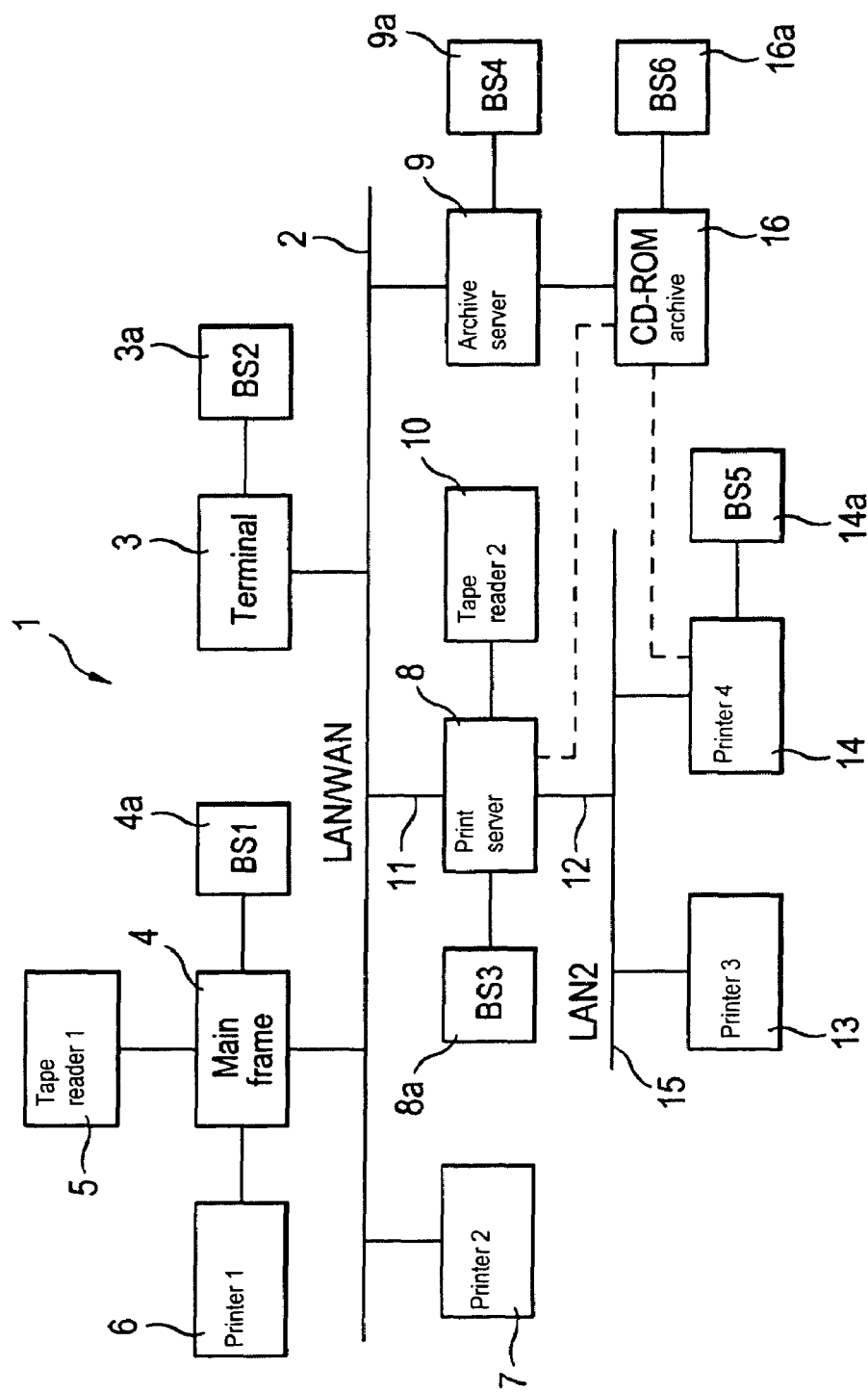
FIG. 1 is a functional block diagram of a print production system.

FIG. 1 shows a high-performance printing system 1 wherein various system components are connected to one another via a data network 2 that can be a local network (local area network, LAN) or, a larger network (wide area network, WAN). At least one client terminal 3 at which print jobs can be generated is attached to the network 2. The terminal 3 is a type of known computer (for example, personal computer PC) with a connected display screen 3a.

The print jobs can also be optionally generated on a main frame 4, or data from the main frame 4 can at least be inserted into the print job. The main frame 4 of the computer center is driven via a suitable operating system control such as MVS, BS2000 or VSE. Control functions and displays via the picture screen 4a connected thereto can ensue at the main frame 4. A tape reader device 5 as well as a first high-performance printer 6 are also directly connected to the main frame 4.

A second printer 7, a print server 8 as well as an archive server 9 are also connected to the data network 2.

The print server 8 is in turn connected to a second tape reader device 10 as well as to a display screen 11. In addition to the connection between the print server and the main data network unit 2, the print server is connected via the connection 12 to a second, local network 15 to which further printers 13 and 14 are connected. The print server 8 as well as the printer 14 can be optionally connected to a system for the production of archive stores (such as a CD-ROM) 16. The archive system 16, is mainly attached to the archive server 9. Additional picture screens 9a, 16a and 14a are connected to the respective devices 9, 16 and 14.

Figure 2:
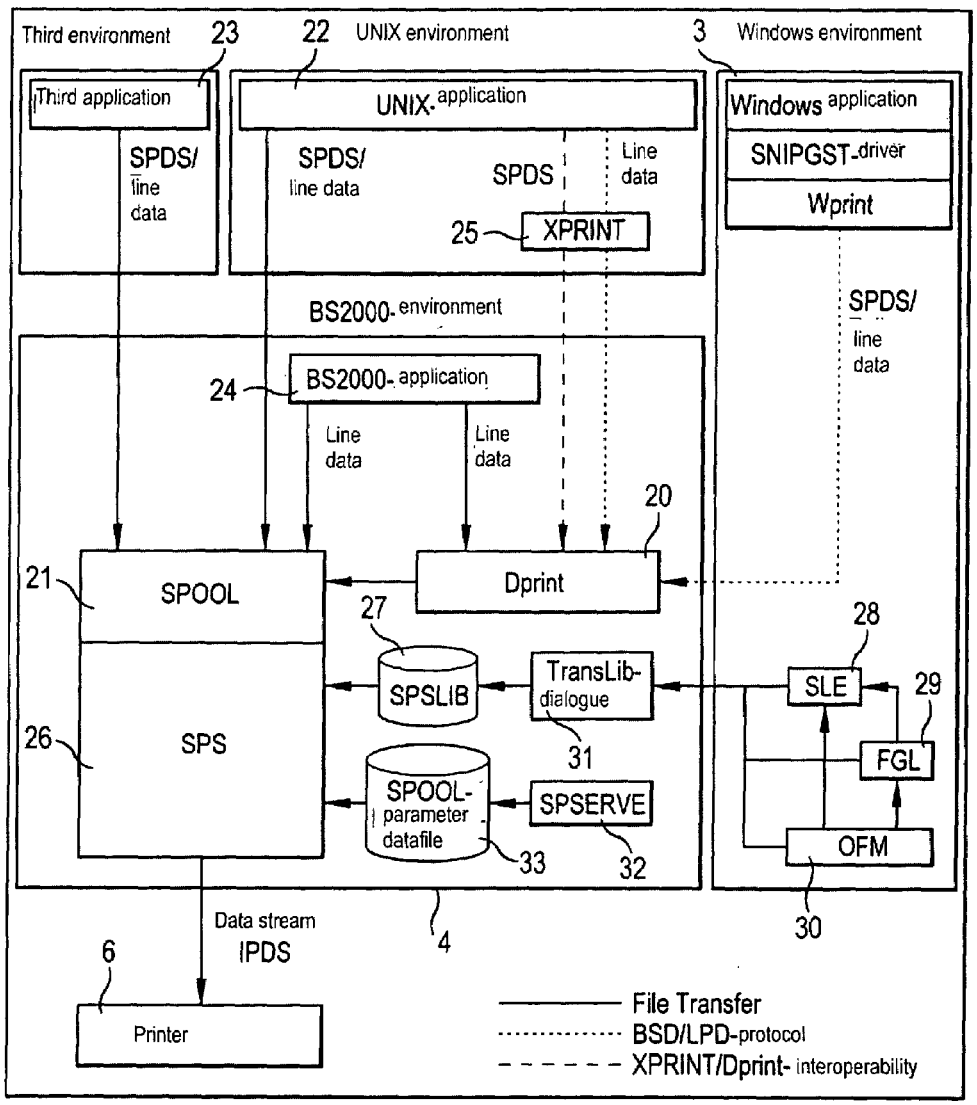
FIG. 2 is a functional block diagram of a mainframe environment.

FIG. 2 described essential system components that run within a Windows application in a terminal 3 and in a main frame 4 operated under the operating system BS2000. The IPDS data stream that is thereby generated is output to a printer, whereby one of the other printers 7, 13, 14 of FIG. 1 can also be driven instead of the printer 6 shown here. Print data files that have been generated in the structured field format in the Windows environment are handed over to the print data spooler 21 as data stream SPDS (Siemens Nixdorf printer data stream) via the function unit 20 (D-print). The spooler 21 can also directly accept line data or SPDS data from a Unix application 22 or some other application 23 (for example, IBM) or directly receive and process line data from the operating system of the main frame 4 or, respectively, from a corresponding application 24.

Print data that have been generated under the Unix application 22 can also be handed over via the system component 25 (X-print) to the BS2000 component 20 (D-print) and then be supplied to the spooler 21.

The system 26 (SPS) makes a standard library 27 (SPS LIB) available that contains a plurality of standard print resources such as form definitions, page definitions, page segments and overlays. These library components can be utilized when they are produced in the windows environment by means of the Windows applications 28 (smart layout editor SLE), 29 (form generation library) and 30 (Océ font manager OSM). Print resources produced in this way are then made available to the BS2000 spool printer driver 26 (SPS spool print system) via the component 31 (trans lib dialog) upon utilization of the SPS library 27.

In order to introduce settings printer-adapted to a specific printer into the print data stream (print job), spool parameters can be constructed as data file 33 via the system component 32 (SPSERVE). Such a parameter data file can relate to the typesetting, the printer definition are to the printer job itself and link corresponding data into the print data stream.

Instead of being operated with the operating system BS2000 shown in FIG. 2, the main frame can also be operated with some other operating system suitable for a main frame, for example with the operating system MVS.

Figure 3:
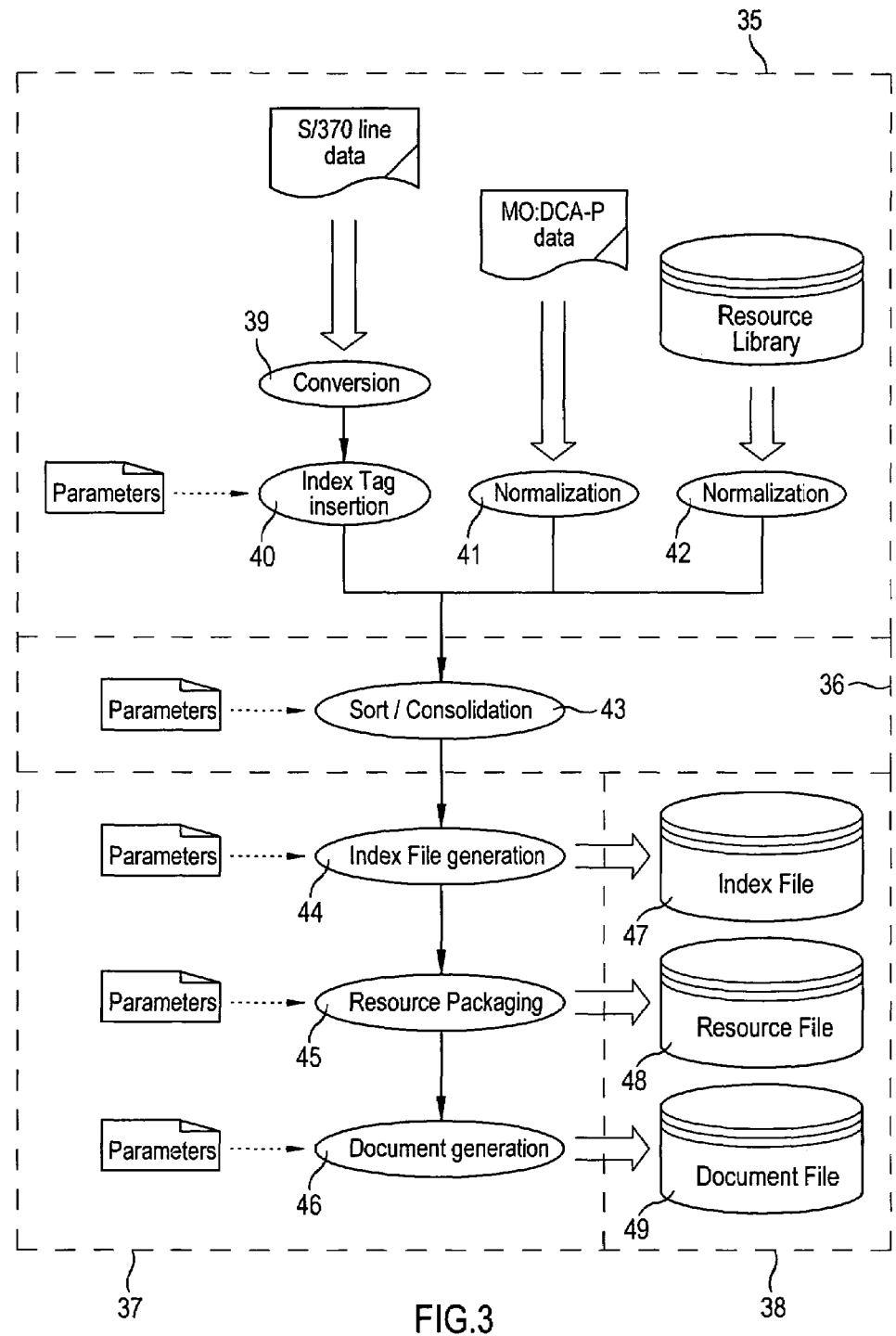
FIG. 3 is a flowchart for processing print data streams.

FIG. 3 shows how various input data streams are processed within the system 26 (SPS) in order to be able to undertake and indexing and, ultimately, sorting of the print data corresponding to the criteria that prescribe the input parameters (sorting parameters, sorting properties).

Incoming print data streams are thereby processed in a plurality of process stages. In a first process stage 35, the incoming data streams are normalized, i.e. converted onto a normed, uniform data format. In a second step 36, the normed print data are sorted; in a third step 37, the data to be output are converted; and, in the fourth step 38, the output data files are generated.

Within the first process stage 35, for example, S/370 line data are converted in a first conversion process 39 onto the internal AFP print data format. In the process 40, the data converted in this way are then supplemented with index features that are produced on the basis of application-specific parameters.

Data that already largely conform to the internal AFP data format such as, for example, MO:DCA data are only slightly modified in the normalization processes 41 and 42, so that that exactly correspond to the internal AFP data format. The sorting and consolidation process 43 that runs in the second process stage 36 is likewise controlled by external parameters that can be defined either job-specifically or individually directly at the host (main frame).

The processes 44 running in the third process stage 37 for forming an index data file, 45 for forming the resources data file and 46 for generating the document from resources data and variable data are controlled with respective parameters supplied from the outside.

In the fourth process stage 38, finally, the index data file 47, the resources data file 48 and the document data file 49 are output, as a result whereof the complete, sorted print data stream is available for the printing.

Figure 4:
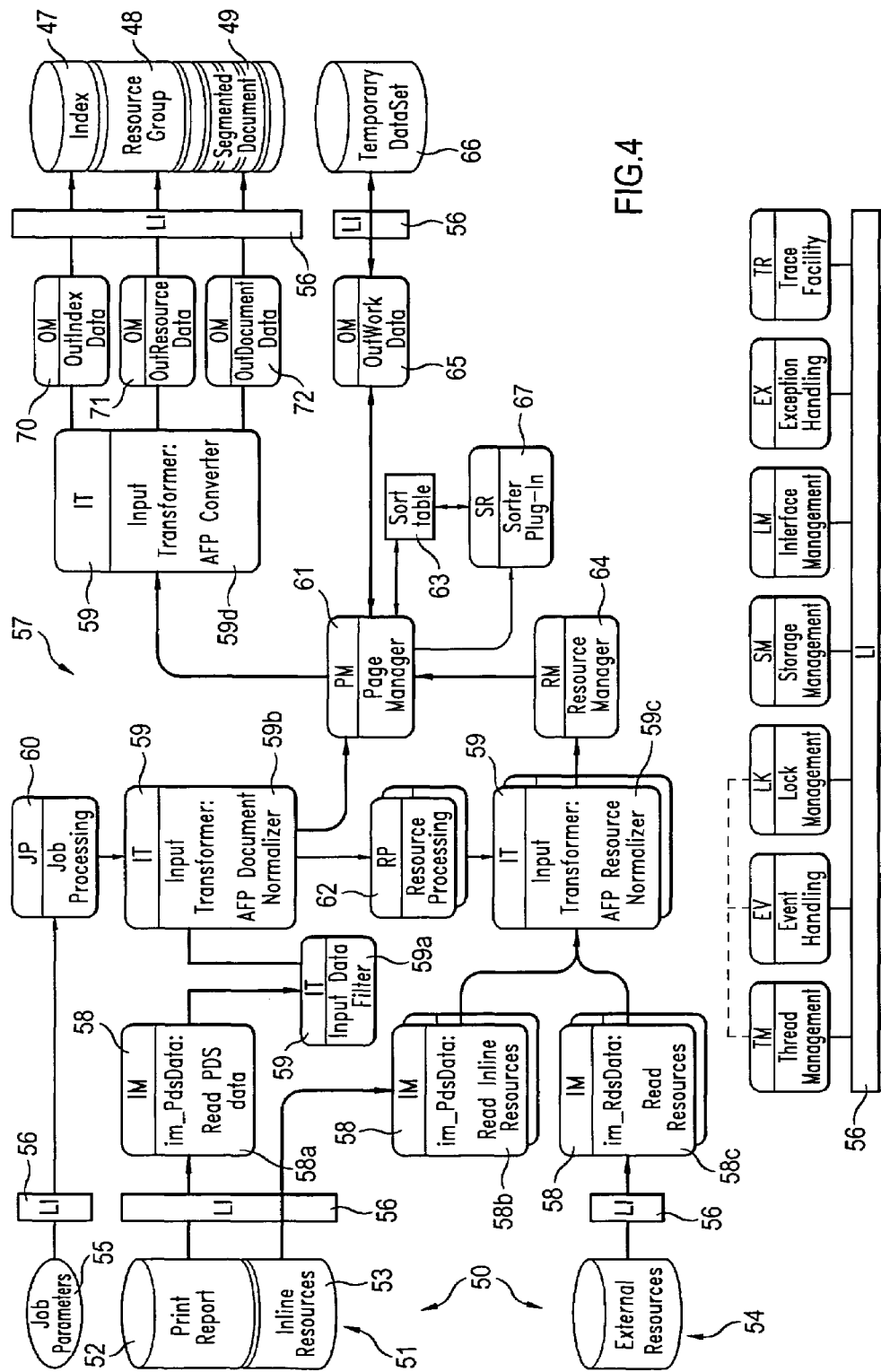
FIG. 4 is a functional block diagram of system components for converting, indexing and sorting print data streams.

FIG. 4 shows a processing of print data as already schematically shown in FIG. 3 with more detailed system components. The method and the system components preferably run in the main frame 4 but can also run in some other computer such as, for example, in the print server 8 or in the printer 6.

An incoming print data stream 50 is thereby classified according to a primary data stream 51 that can contain variable print data 52 (print report data) and integrated resources data 53 (inline resources). The incoming data stream 50 can also contain only resources, what are referred to as external resources 54.

The incoming print data as well as job-specific job parameter data 55 are read into the conversion, indexing and sorting system 57 (CIS) via a logical interface 56 (LI). The logical interface 56 thereby acts like a higher-ranking process controller that monitors, enables and, if necessary, blocks various individual processes. To that end, the logical interface 56 comprises a number of sub-modules that are shown at the bottom in FIG. 4, namely a module of process control (threat management, TM), a module for controlling events (event handling, EV), a module for coordinating the memory accesses of different processes (lock management, LK), a memory management module (SM), a non-system-specific interface management module (LM), a module for handling exception states (EX) and a module for controlling status information (trace facility, TR). The logical interface 26 is thereby system-specifically designed, i.e. matched to the higher-ranking operating system such as MVS, BS 2000, UNIX or Windows NT. The other system components shown in FIG. 4 are thereby independent of operating system, so that a simple change from a first operating system to a second operating system is possible by adapting the logical interface 26.

An import routine 58 "im_PdsData" serves for the import of an incoming print data stream, whereby the variable data are read-in in a work process 58a, the integrated resources in a process 58b and the external resources in a process 58c.

The data that have been read in a processed in an input transformation module 59, whereby the variable data 52 are first filtered in a process 59a, normalized onto an internal AFP data format in the process 59b—controlled by the job-specific parameters 55 offered by the job processor 60—, and, finally, handed over to the page processing unit (page manager) 61.

The job parameters 55 contain the values of all parameters that are required for the normalization, indexing, sorting and conversion of the print data stream. As a result of the process data supplied from the job processor 60 to the input transformation module 59, all information in the system are known that are required for the indexing of the primary data stream—insofar as this is not already indexed at the input side—and that are required for sorting the primary data stream 52.

During the normalizing of the primary data 52 in the process 59b, index information that already exist—particularly given primary data that are already present in the AFP print data format—are identified and edited in order to be able to produce a sorting table 63.

During the course of the normalization in the processing step 59b, primary data that are not already present in the AFP print data format, for example S/370 line data, are converted into the print data format and index information are inserted into the AFP print data stream in conformity with the parameter values offered by the job processor 60. This indexing information is likewise used later by the page manager 61 for building up the sorting table 63.

During the course of the normalization process 59b, a determination is also made regarding which resources are to be allocated to the primary print data stream 52, and a corresponding normalization process for the appertaining resources is started in step 59b by means of a message via the resources processing unit 62. Each resource—for example, character sets, watermarks (overlays) or page segments—that is required in the primary data stream thereby effects a normalization process of the corresponding resource. The overall system is thereby designed as a multi-process system, so that both the normalization of the primary data stream as well as the parallel (simultaneous) normalization of a plurality of resource data can ensue. Each required resource dataset is thereby normalized independently of the other resource datasets, namely only respectively once regardless of how often the appertaining data of the resource dataset are needed in the primary data of a print job.

Which external resources 54 (resource data library) are needed for the respective print job can thereby be indicated in the job parameters 55.

The resource data normalized in the process step 59b are supplied directly to the AFP conversion process 59d by the resource manager 64 and the page manager 61 and are deposited in the resources data file 48 as finished resources print data stream 71 via the logical interface 56.

The primary data normalized in the step 59b are intermediately stored in a temporary data memory 66 (for example, random access memory, RAM) via the page manager 61, a relocation module 65 and the logical interface 56. The allocated information about the position of the intermediately stored data relative to other data (page, sheet or document) is deposited in the temporary data memory and is additionally deposited in the sorting table 63 as corresponding entry. The page manager thereby assumes a central control and coordination task for the allocation, intermediate storage and sorting of the primary, variable data.

The sorting according to the criterion of the sorting parameters of the job is then implemented by the sorting module 67 upon application of the sorting table 63 and the mediation of the page manager 61.

The variable data can be found in a simple way via the entries in the sorting table after the sorting procedure has been implemented.

The sorting process in the sorting module only starts after all variable data of the primary data stream 52 belonging to a print job have been normalized and all resources data required for the print job have been correspondingly processed. At this time, all resources data are already deposited in the resources data file 48 and all variable print data in the intermediate memory 66.

The sorting process in the sorting module 67 can be implemented as memory-immanent table sorting procedure within the sorting table 63. The new sorting sequence is defined by the sorting algorithm and by the contents of the index entries. The variable print data deposited in the intermediate memory 66 can thus remain completely untouched during the sorting process.

As soon as the sorting event has ended, the page manager 61 fetches the print data from the intermediate memory 66, whereby the fetch sequence is implemented on the basis of the new sorting sequence in the sorting table 63. In these way, pages, sheets and documents are fetched from the intermediate memory 66 corresponding to the new sorting sequence [and] forwarded by the page manager 61 to the conversion unit 59d for generating the output print data stream 72 and for deposit in the document data file 49. Finally, the page manager 61 also generates a new index data stream 70 from the sorting table 63 and deposits this in the index data file 47. Offset values and offset locations of the index data in the index data file 47 correspond to the offset values and offset locations of the data in the document data file 49.

Returning to FIGS. 3 and 4, it can again be stated that the first process stage 35 was realized in the processes 59b and 59c. The second process stage 36 is realized in the sorting unit 67, the third process stage 37 is realized in the output conversion process 59d, and the fourth process stage 38 in the data files 47, 48 and 49 shown in FIG. 4.

The normalization of the primary data stream 52 ensues in the processes 58a and 59b; the normalization of the resources data ensues in the processes 58b, 58c and 59c; and the sorting, output conversion as well as data generation of the primary data stream ensues in the components 61, 65, 67, 59d and 72.

The index data file 47, the resources data file 48 and/or the document data file 38 can, in particular, be used in browser applications and archiving systems for searching and/or storing data.

Two different sorting methods that can be implemented with the above-described systems shall now be described with reference to FIGS. 5 and 6. An initial document 80 is thereby re-sorted in FIG. 5 according to a layout sorting sequence, whereby the rule $$1, n, 2, (n-1), 3, (n-2),\qquad\text{(Rule 1)}$$

applies. The sheets 81 through 89 were thereby re-sorted such that the document 90 derives after the sorting. The sorting sequence shown in FIG. 5 is useful particularly in the production of brochures with a zig-zag fold. Other folding possibilities are disclosed, for example, by WO-A1-00/68877, whose content relating to folding possibilities for signatures is herewith incorporated by reference into the present specification. An example for producing a signature by re-sorting shall be explained in greater detail below on the basis of FIG. 8.

Figure 6:
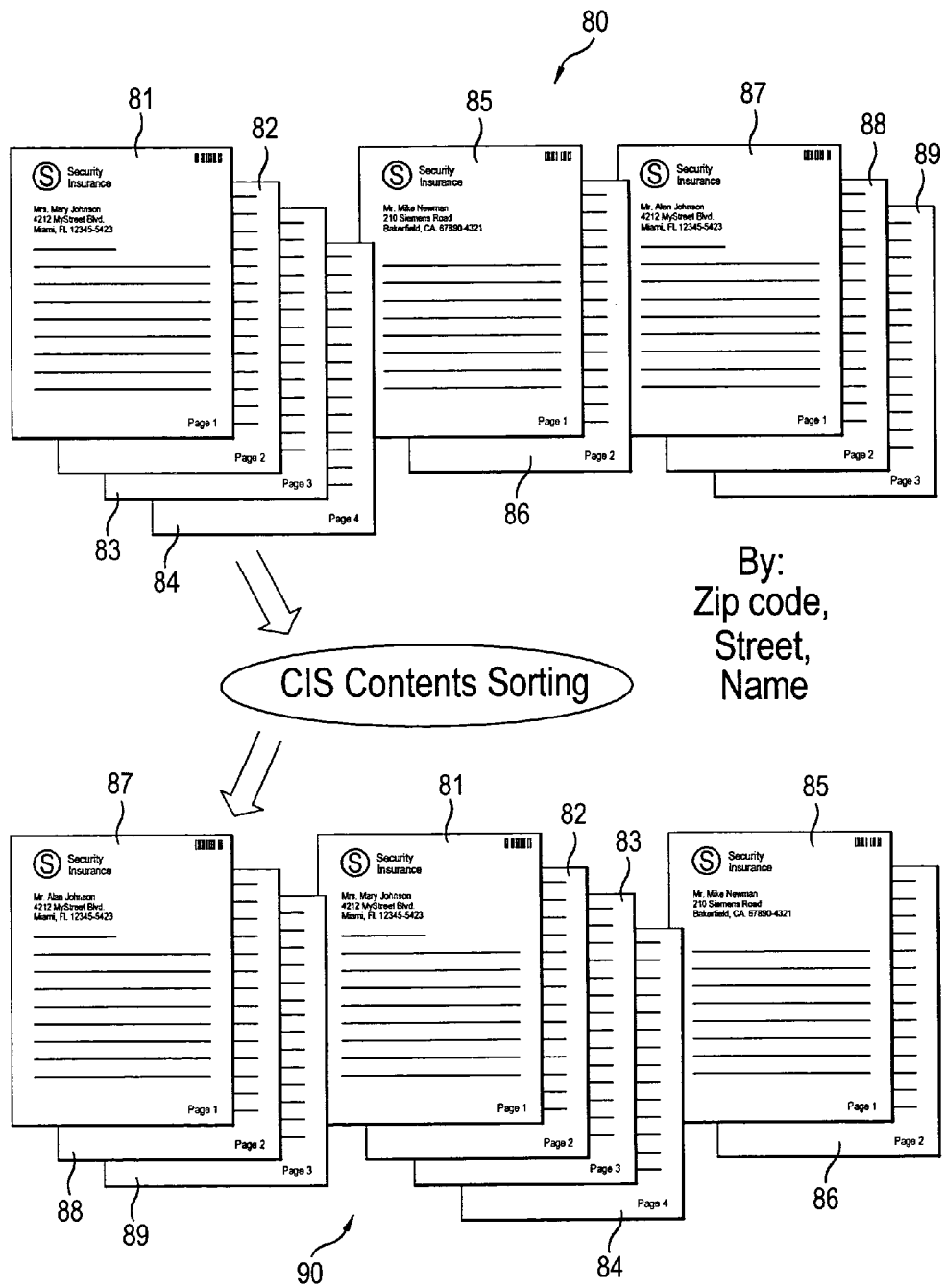
FIG. 6 is a schematic diagram showing an example for sorting according to print data contents.

An alternative rule, "sorting according to content", Rule 2, can be seen in FIG. 6. The sorting thereby ensues according to zip code, street and/or name. Sheets that were designated as a unit in the input document 80—the sheets 81 through 84 as well as the sheets 85 and 86 and the sheets 87 through 89 here—are re-sorted such here that they are ordered in the output data stream in the sequence 87-88-89 (first document) for the addressee name "Allan Johnson" and, further, 81-82-83-84 (second document) for the addressee name "Mary Johnson" and, finally pages 85 and 86 (third document) for the addressee name "Mike Newman".

Figure 7:
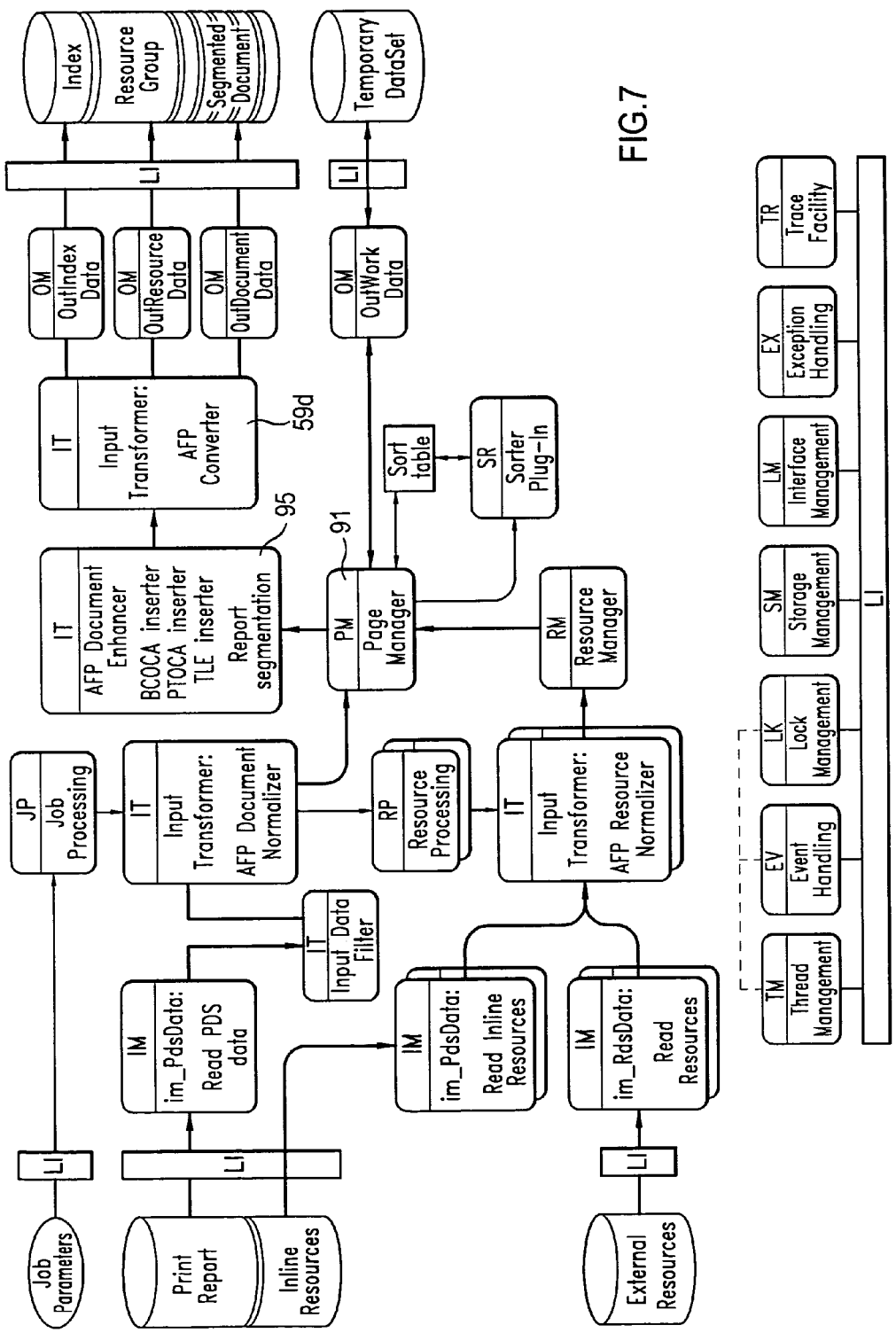
FIG. 7 is a functional block diagram of a system for converting, indexing and sorting as well as for inserting auxiliary information into a print data stream.

The system illustrated in FIG. 7 corresponds to the system shown in FIG. 4, whereby a function unit 95 intervenes here between the page manager 91 and the output conversion unit 49*d*, additional information that were previously not contained in the data stream being capable of being added in the output print data stream with the assistance of said function unit 95. This function unit can be optionally called, i.e. that following additional information can be inserted dependent of the given job parameters:

specific AFP-specific information that further improve the data flow;

customer-specific information (data inserter) such as barcode inserter (BCOCA), color attributes (PTOCA) or texts.

Figure 8:
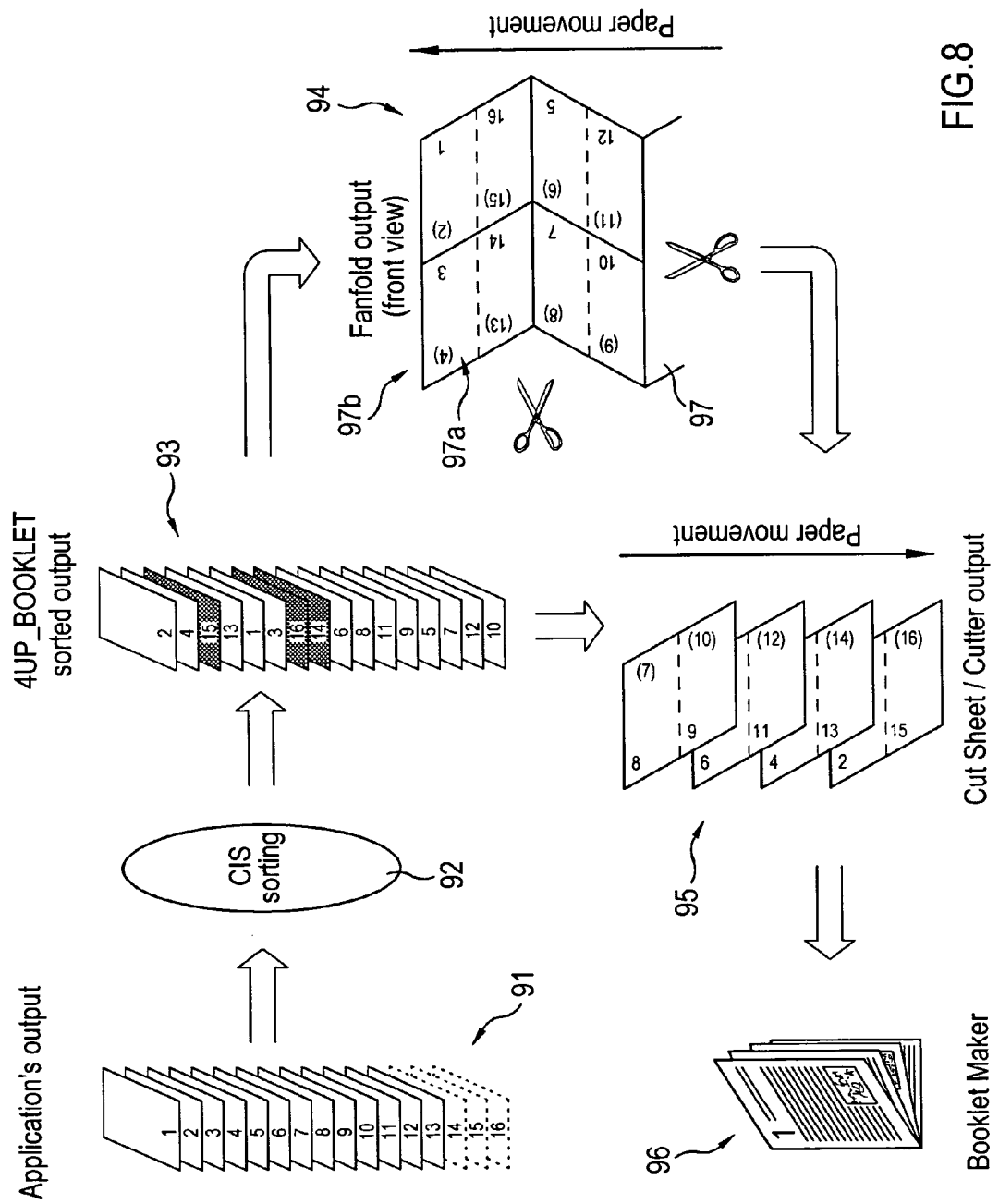
FIG. 8 is a schematic diagram of a sorting procedure for producing a brochure.

FIG. 8 shows how a data stream 91 that comprises 16 pages in ordered sequence (ascending page numbers 1, 2, 3, 4, 5 . . . ) is re-sorted for producing a brochure (booklet) 96. To that end, the input data stream 91 is re-sorted to what is referred to as a 4up booklet data stream 93 in what is referred to as a 4up booklet sorting in a processing step 93. The page sequence then reads page 2, page 4, page 15, etc. (see FIG. 8).

The 4up booklet data stream can then be printed on a recording medium (for example, on paper) on a printer device in what is referred to as a 4up printing event 94 with modulo 8-page production. Respectively two pages are thereby printed next to one another on the front side and on the back side of a web-shaped recording medium 97 (for example, what is referred to as fanfold paper). For example, the pages 3 and 1 then lie next to one another on the front side 97*a* of the fanfold paper 97, followed by the pages 14 and 16 on the front side 97*a*. With respect to page 3, the page 14 is printed on the back side 97*b*, and page 2 is printed on the back side of page 1, etc. In FIG. 8, the page numbers of the pages printed on the back side are thereby respectively indicated in brackets.

Subsequently, the fanfold paper is cut such to form signatures 95 that respectively four pages (two on the front side 97*a* and two on the back side 97*b*) lie on a signature. The signatures 95 are then placed on top of one another in the print sequence and bound to form a brochure. Corresponding to the printed page sequence or, respectively, sheet sequence, the original page sequence (page 1, page 2, page 3, . . . ) thereby derives again in the brochure 96.

The 4up booklet printing method is suited, for example, for producing DIN A5 brochures when the printing ensues on DIN A3 wide paper (fanfold or single sheets, what is referred to as cut-sheet paper).

Exemplary embodiments of the invention have been described. It is thereby clear that a person skilled in the art can recite developments and modifications of the invention without further ado. For example, new, additional or different types of sorting criteria can be specified without further ado, as can details of the input, querying or presentation of sorting criteria.

For example, an additional sorting criterion could provide combining the properties of a content sorting and of a layout sorting. For example, a content sorting according to Rule 2 could first ensue according to zip code and name, followed by a layout sorting according to Rule 1 for a brochure within the document of a customer (name).

Further, it is conceivable to employ index particulars such as IELs (index elements) or TLEs (tag logical entry) already present in an AFP data stream for the inventive re-sorting.

The invention is especially suited for being realized as a computer program (software). It can thus be disseminated as computer program module, as a data file on a data carrier like a diskette or CD-ROM or as a data file via a data or, respectively, communication network. Such and comparable computer program products or computer program elements are developments of the invention. The inventive execution can be employed in a computer, in a printer device or in a printing system with preceding or following data processing devices. It is thereby clear that corresponding computers on which the invention is applied can contain further, known technical devices like input means (keyboard, mouse, touch screen), a microprocessor, a data or, respectively, control bus, a display device (monitor, display) as well as a main memory, a hard disk store and a network card.

According to various advantages of the invention, prescribed data fields are accepted in a known way into an index table during the course of the indexing, and the position and the incoming data are allocated to this index when they contain the indexed data field. The individual data in the overall print data stream can be very quickly located on the basis of the index data that are thereby generated. The present invention makes use of this effect in that it also uses the indices for ordering the print data in view of the sorting sequence to be produced. The invention thereby particularly enables the sorting sequence of larger documents, i.e. documents corresponding to a plurality of printed pages, to be re-sorted in view of the page sequence. This function of what is referred to as "layout sorting" is particularly advantageous for producing brochures when signatures are employed, whereby a plurality of pages following one another in the brochure are printed on a common, interrelated printed sheet and the signature produced in this way are merged by folding techniques and cutting techniques to form printed matter capable of being bound.

Another sorting sequence according to a preferred exemplary embodiment of the invention provides that documents respectively belonging together and that can also cover several pages be sorted according to content criteria, for example to sort letters, given letters to specific addressees, according to zip code, name of the addressee or comparable contents. This sorting sequence then enables a time-optimum realization of the further-processing of the printed matter—particularly when sending letters—in a production process wherein the letters are combined according to shipping locations and, thus, a cost-beneficial shipping is enabled. Compared to existing solutions wherein print data are present and printed out in an unfavorable sequence, a considerable saving in view of work and processing time can thus be enabled because the documents that are printed out no longer have to be re-sorted after the printout. This advantage plays a particular part when the user produced the print data stream in a first sorting sequence (based, for example, on the name of the addressee), and the print job that has thus been produced is to be re-sorted according to a new sorting criterion—for example, the zip code of the addressees—at a later time, for example immediately before the printing. In the print production process, the invention thus makes it possible to undertake a sorting or re-sorting adapted to later processing steps that follow the printing at a relatively late point in time (shortly or immediately before printing).

Given documents that do not directly follow one another in the print data stream but that are to be directed to the same addressee, the invention also makes it possible to send these in common to the appertaining addressees on the basis of person-related indices such as name and first name, customer number and the like. As a result thereof, shipping costs can be saved and the addressees are also spared the definitely annoying, simultaneous reception of different shipments from one and the same sender. The invention thus enables the compilation of various documents according to the parameters respectively desired for the compilation (merge function).

The invention is particularly suited for application to print data streams such as S/370 Line Data, AFP print data streams and MO:DCA print data streams wherein the print data stream is divisible document-by-document into variable data and static resource data. The resource data can thereby be particularly composed of inline resources that are contained in the incoming print data stream and/or of external resources that are not present themselves in the print data stream but can be linked into the print data stream by referencing.

In another advantageous exemplary embodiment of the invention, the variable data is processed in a first process unit, and the resource data is processed in a second process unit separate from the first process unit.

The parameters for the sorting sequence can, in particular, be prescribed as print job parameters that are already in the print data stream, as data file separate from the print data stream or can also be directly prescribed in the process processing unit.

It can be provided in view of the indexing of the print data stream that indexes already present in the incoming print data stream be employed or that new index parameters as well as corresponding parameters for the sorting sequence of the print data be provided during the course of the inventive data processing.

It is provided in another advantageous embodiment of the invention that specific auxiliary information corresponding to the sorting sequence be introduced into the already sorted data stream. It is thus possible to again supplement or, respectively, enhance an entire print data stream that contains a plurality of documents with individually variable auxiliary information that are adapted to the sorting sequence (data enrichment).

The preferred embodiment of the invention provides that the print data stream in at least the normed print data format (normalized AFP data) is divided document-by-document (pages, job) into variable data (PDS data) and static resource data (resources). The resource data can comprise inline resources that are contained in the incoming print data stream (input data stream) and/or external resources. The variable data (PDS data) are processed in a first process unit (AFP document normalizer), and the resource data is processed in a second process unit (AFP resource normalizer) separate from the first process unit (AFP document normalizer).

Preferably, the sorting parameters are prescribed as print job parameters. In one embodiment, a check is first carried out in an indexing unit (page manager) as to whether the variable data are already indexed and, given non-indexed data, an indexing according to the sorting parameters is undertaken. The variable data (PDS data) can be sorted according to the prescribed sorting parameters (layout sort, contents sort) in a sorting unit (page manager, sorter plug-in). The sorting may ensue in a print production process adapted to production steps that ensue after the printing. The variable data to be sorted can be intermediately stored in an intermediate memory (work dataset). Preferably, the resource data together with the sorted variable data (PDS data) are supplied via the indexing unit (page manager) to an output conversion unit (AFP converter, IT) for forming the output print data stream (index, resource group, segmented document). A parameter value for sorting according to layout (layout sorting) or a parameter value for sorting according to contents (contents sorting) is preferably selectable for the sorting parameter. According to one development, following selection of a sorting parameter value, additional detail parameters (zig-zag folding, zip code) are recited for specifying the sorting sequence of the print data (pages, job). The sorted print data stream can be output in a predetermined print data format, particularly in the print data format AFP (Advanced Function Presentation).

According to the invention a system for processing a print data stream may be provided, whereby the print data stream is converted from a first print data format (S/370, MO:DCA, line data) into a normed, second data format (normalized data, AFP) (normalization step); the print data stream in the normed print data format is indexed (index file generation); the indexed print data stream is sorted by means of prescribed sorting parameters (layout sorting, contents sorting); and the sorted print data stream is output. The system of a preferred embodiment includes means for the implementation of the foregoing method.

The invention also is directed to a computer program for processing a print data stream, whereby the print data stream is converted from a first print data format (S/370, MO:DCA, line data) into a normed, second data format (normalized data, AFP) (normalization step); the print data stream in the normed print data format is indexed (index file generation); the indexed print data stream is sorted by means of prescribed sorting parameters (layout sorting, contents sorting); and the sorted print data stream is output. The computer program preferably has computer program elements for the implementation of a method as set forth above.

Although other modifications and changes may be suggested by those skilled in the art, it is the intention of the inventors to embody within the patent warranted hereon all changes and modifications as reasonably and properly come within the scope of their contribution to the art.

Method and System for Data Processing

The invention is directed to a method and a system for data processing. In particular, it is directed to a method and a system for processing a print data stream that is edited for output to a printer device. Such an editing typically occurs in computers that process print datafiles or print data from user programs in printer-adapted fashion. The print data are thereby converted, for example, into an output stream of a specific print data language such as AFP® (Advanced Function Presentation), PCL or PostScript.

The print data in large computing centers are typically compiled (spooling event) in a host computer (main frame) and print jobs are generated therefrom that are adapted such for output to high-performance printing systems that the high-performance printing systems can have optimum time usage in the production operations. They can thereby be largely utilized in continuous operation.

Such high-performance printers with printing speeds from about 40 DIN A4 pages per minute up to more than 1000 DIN A4 pages per minute are described, for, in the publication "Das Druckerbuch", edited by Dr. Gerd Goldmann (Océ Printing Systems GmbH), Edition 4C, October 1999, ISBN 3-000-00 1019-X. Chapter 12 of this publication (pages 12-1 through 12-18) of this publication describe the server system known by the name of PRISMA PROS that serves for editing print data streams in production printing environments.

The AFP format (Advanced Function Presentation) is a typical print data format in electronic production printing environments, this being described, for example, in the publication number F-544-3884-01 of International Business Machines Corp. (IBM) bearing the title "AFP Programming Guide and Line Data Reference", This publication also describes the specification for a further data stream having the designation "S/370 Line-Mode Data". The print data stream AFP was developed further into the print data stream MO:DCA that is described in the IBM publication SC31-6802-04 bearing the title "Mixed Object Document Content Architecture Reference". Details of this data stream, particularly the employment of structured fields, are disclosed by U.S. Pat. No. 5,768,488.

The assignee markets a spooling system for high-performance printing systems under the trademark SPS that is in the position of processing a plurality of different print data streams from different applications, of spooling under different operating systems such as MVS or BS 2000 and converting into a device-oriented data stream such as, for example, IPDS (Intelligent Printer Data Stream).

IBM has created the program known as ACIF with which it is possible to convert and index streams. The ACIF application is described in the IBM brochure G544-3824-00 bearing the title "Conversion and indexing facility application programming guide" as well as in the IBM brochure number S544-5285-00 bearing the title "AFP conversion and indexing facility (ACIF) user's guide".

U.S. Pat. No. 5,727,220 and U.S. Pat. No. 5,680,615 disclose methods and systems wherein interrelated objects of a document are processed via a structured data stream such as MO:DCA or IPDS.

U.S. Pat. No. 4,209,845 discloses a system with which print data can be sorted. U.S. Pat. No. 5,613,110 discloses a method for indexing data. U.S. Pat. No. 5,187,750 discloses an archiving system with which printed originals to be archived can be optoelectronically scanned and durably stored in a long-term store such as magnetic tapes or optical storage elements (CD-ROM).

The International Patent Application WO-A1-00/68877 filed by the assignee discloses a method and a system with which print data can be edited in a logical page sequence corresponding to a signature for printing in what is referred to as an imposition procedure.

The contents of the above-cited publications and patent applications are herewith incorporated by reference into the present specification.

When outputting print data in high-speed printing applications that are employed, for example, in computer centers or, too, in printing centers for what is referred to as the PoD (Printing on Demand) application, the print data are specifically edited therefor that they can be processed as fast as possible in the print production environment and ultimately transfer-printed on the recording medium. The data editing thereby mainly ensues in view thereof that the print output meet certain presentation demands of the final consumer (reader of the printed information). Further, users of print data processing programs normally want to assess the generated print data before these are actually printed. In addition to programs that already present the print data in the way they are printed (what are referred to as "what you see is what you get", WYSIWYG programs), what are referred to as viewing and navigating programs (or, respectively, browsers) are also utilized that enable not only the advance checking of the printer result but also the targeted locating of information on the basis of indexed objects. Such an indexed navigation possibility is advantageous particularly given print processing programs in the aforementioned production environment wherein the print jobs may be extremely large and can comprise several thousand pages. A corresponding program with the name "AFP Workbench for Windows" has been disclosed by IBM.

An object of the invention is to create a method and a system that enable the print data to be prescribed variably and user-specifically in a print production system.

This object is achieved by the invention recited in the independent claims. Advantageous embodiments are the subject matter of the subclaims.

Inventively, a print data stream arriving or, respectively, present in a first print data format is converted into a normed print data stream and the print data stream converted in this way is indexed on the basis of prescribed indexing criteria. The indexed print data stream is then sorted in a sorting sequence by means of prescribed sorting parameters, and the sorted print data stream is output for further processing, particularly for the printout.

In particular, prescribed data fields are accepted in a known way into an index table during the course of the indexing, and the position and the incoming data are allocated to this index when they contain the indexed data field. The individual data in the overall print data stream can be very quickly located on the basis of the index data that are thereby generated. The present invention makes use of this effect in that it also uses the indices for ordering the print data in view of the sorting sequence to be produced. The invention thereby particularly enables the sorting sequence of larger documents, i.e. documents corresponding to a plurality of printed pages, to be re-sorted in view of the page sequence. This function of what is referred to as "layout sorting" is particularly advantageous for producing brochures when signatures are employed, whereby a plurality of pages following one another in the brochure are printed on a common, interrelated printed sheet and the signature produced in this way are [sic] merged by folding techniques and cutting techniques to form printed matter capable of being bound.

Another sorting sequence according to a preferred exemplary embodiment of the invention provides that documents respectively belonging together and that can also cover several pages be sorted according to content criteria, for example to sort letters, given letters to specific addressees, according to zip code, name of the addressee or comparable contents. This sorting sequence then enables a time-optimum realization of the further-processing of the printed matter—particularly when sending letters—in a production process wherein the letters are combined according to shipping locations and, thus, a cost-beneficial shipping is enabled. Compared to existing solutions wherein print data are present and printed out in an unfavorable sequence, a considerable saving in view of work and processing time can thus be enabled because the documents that are printed out no longer have to be re-sorted after the printout. This advantage plays a particular part when the user produced the print data stream in a first sorting sequence (based, for example, on the name of the addressee), and the print job that has thus been produced is to be re-sorted according to a new sorting criterion—for example, the zip code of the addressees—at a later time, for example immediately before the printing. In the print production process, the invention thus makes it possible to undertake a sorting or re-sorting adapted to later processing steps that follow the printing at a relatively late point in time (shortly or immediately before printing).

Given documents that do not directly follow one another in the print data stream but that are to be directed to the same addressee, the invention also makes it possible to send these in common to the appertaining addressees on the basis of person-related indices such as name and first name, customer number and the like. As a result thereof, shipping costs can be saved and the addressees are also spared the definitely annoying, simultaneous reception of different shipments from one and the same sender. The invention thus enables the compilation of various documents according to the parameters respectively desired for the compilation (merge function).

The invention is particularly suited for application to print data streams such as S/370 Line Data, AFP print data streams and MO:DCA print data streams wherein the print data stream is divisible document-by-document into variable data and static resource data. The resource data can thereby be particularly composed of inline resources that are contained in the incoming print data stream and/or of external resources that are not present themselves in the print data stream but can be linked into the print data stream by referencing.

In another advantageous exemplary embodiment of the invention, the variable data are processed in a first process unit, and the resource data [ . . . ] in a second process unit separate from the first process unit.

The parameters for the sorting sequence can, in particular, be prescribed as print job parameters that are already in the print data stream, as datafile separate from the print data stream or can also be directly prescribed in the process processing unit.

It can be provided in view of the indexing of the print data stream that indexings already present in the incoming print data stream be employed or that new index parameters as well as corresponding parameters for the sorting sequence of the print data be provided during the course of the inventive data processing.

It is provided in another advantageous embodiment of the invention that specific auxiliary information corresponding to the sorting sequence be introduced into the already sorted data stream. It is thus possible to again supplement or, respectively, enhance an entire print data stream that contains a plurality of documents with individually variable auxiliary information that are adapted to the sorting sequence (data enrichment).

Exemplary embodiments and further advantages of the invention are described below on the basis of some Figures.

Figure 5:
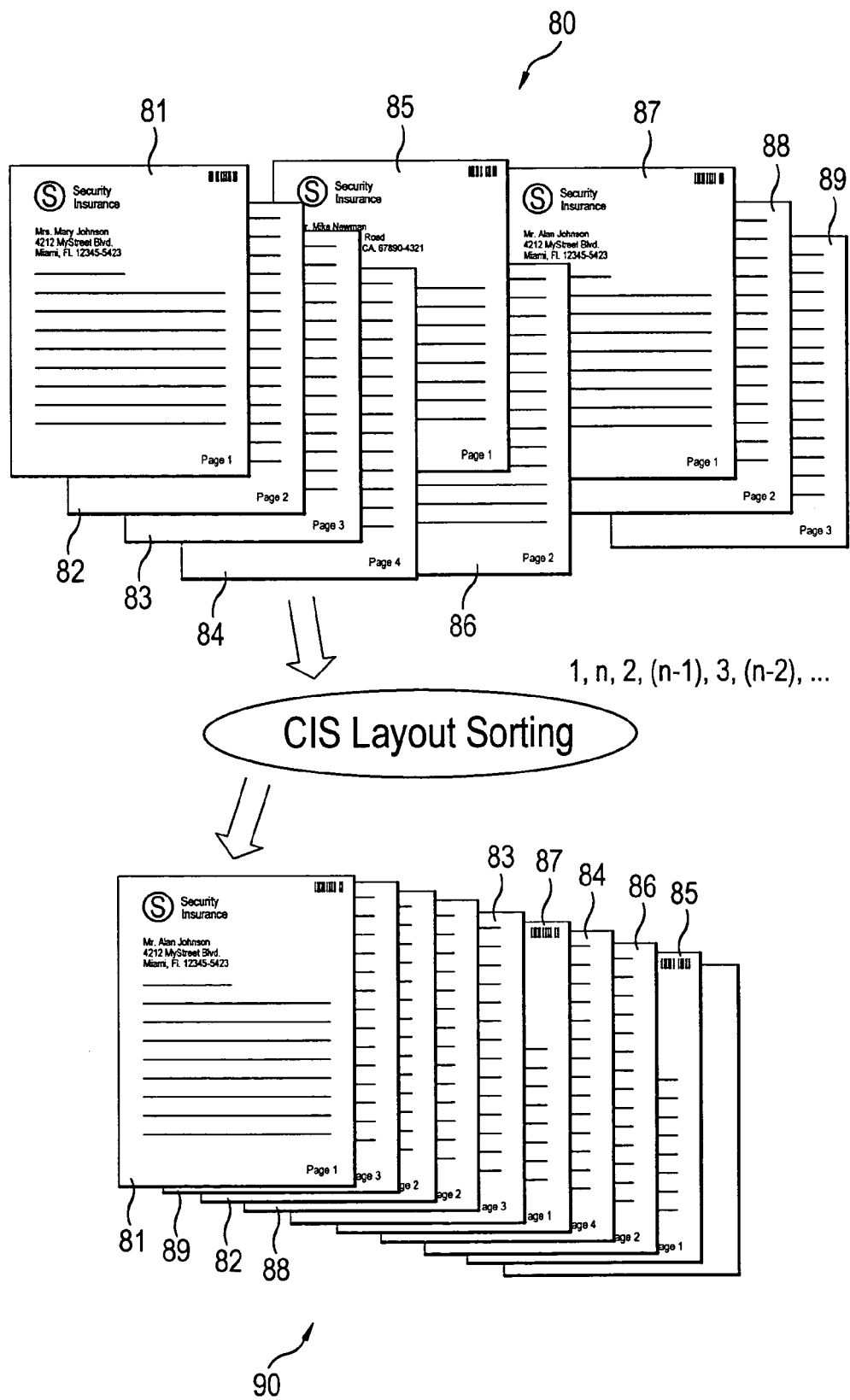
FIG. 5 is a schematic diagram showing an example for sorting according to layout parameters.

Shown are:

FIG. 1 a print production system;

FIG. 2 a mainframe environment;

FIG. 3 a flowchart for processing print data streams;

FIG. 4 system components for converting, indexing and sorting print data streams;

FIG. 5 an example for sorting according to layout parameters;

FIG. 6 an example for sorting according to print data contents;

FIG. 7 a system for converting, indexing and sorting as well as for inserting auxiliary information into a print data stream;

FIG. 8 a sorting procedure for producing a brochure.

FIG. 1 shows a high-performance printing system 1 wherein various system components [ . . . ] via a data network 2 that can be a local network (local area network, LAN) or, too, a larger network (wide area network, WAN). At least one client terminal 3 at which print jobs can be generated is attached to the network 2. The terminal 3 is a known computer (for example, personal computer PC) with connected picture screen 3*a*.

The print jobs can also be optionally generated on a main frame 4, or data from the main frame 4 can at least be inserted into the print job. The main frame 4 of the computer center is driven via a suitable operating system control such as MVS, BS2000 or VSE. Control functions and displays via the picture screen 4*a* connected thereto can ensue at the main frame 4. A tape reader device 5 as well as a first high-performance printer 6 is [sic] also directly connected to the main frame 4.

A second printer 7, a print server 8 as well as an archive server 9 are also connected to the data network 2.

The print server 8 is in turn connected to a second tape reader device 10 as well as to a picture screen 11. In addition to the connection 11 [sic] between the print server and the main data network unit 2, the print server is connected via the connection 12 to a second, local network 15 to which further printers 13, 14 are connected. The print server 8 as well as the printer 14 can be optionally connected to a system for the production of archive stores (CD-ROM) 16. The archive system 16, is mainly attached to the archive server 9. Additional picture screens 9*a*, 16*a* and 14*a* are connected to the respective devices 9, 16 and 14.

FIG. 2 described essential system components that run within a Windows application in a terminal 3 and in a main frame 4 operated under the operating system BS2000. The IPDS data stream that is thereby generated is output to a printer, whereby one of the other printers 7, 13, 14 of FIG. 1 can also be driven instead of the printer 6 shown here. Print datafiles that have been generated in the structured field format in the Windows environment are handed over to the print data spooler 21 as data stream SPDS (Siemens Nixdorf printer data stream) via the function unit 20 (D-print). The spooler 21 can also directly accept line data or SPDS data from a Unix application 22 or some other application 23 (for example, IBM) or directly receive and process line data from the operating system of the main frame 4 or, respectively, from a corresponding application 24.

Print data that have been generated under the Unix application 22 can also be handed over via the system component 25 (X-print) to the BS2000 component 20 (D-print) and then be supplied to the spooler 21.

The system 26 (SPS) makes a standard library 27 (SPS LIB) available that contains a plurality of standard print resources such as form definitions, page definitions, page segments and overlays. These library components can be utilized when [ . . . ] are produced in the windows environment by means of the Windows applications 28 (smart layout editor SLE), 29 (form generation library) and 30 (Océ font manager OSM). Print resources produced in this way are then made available to the BS2000 spool printer driver 26 (SPS spool print system) via the component 31 (trans lib dialog) upon utilization of the SPS library 27.

In order to introduce settings printer-adapted to a specific printer into the print data stream (print job), spool parameters can be constructed as datafile 33 via the system component 32 (SPSERVE). Such a parameter datafile can relate to the typesetting, the printer definition are to the printer job itself and link corresponding data into the print data stream.

Instead of being operated with the operating system BS2000 shown in FIG. 2, the main frame can also be operated with some other operating system suitable for main frame, for example with the operating system MVS.

FIG. 3 shows how various input data streams are processed within the system 26 (SPS) in order to be able to undertake and indexing and, ultimately, sorting of the print data corresponding to the criteria that prescribe the input parameters (sorting parameters, sorting properties).

Incoming print data streams are thereby processed in a plurality of process stages. In a first process stage 35, the incoming data streams are normalized, i.e. converted onto a normed, uniform data format. In a second step 36, the normed print data are sorted; in a third step 37, the data to be output are converted; and, in the fourth step 38, the output datafiles are generated.

Within the first process stage 35, for example, S/370 line data are converted in a first conversion process 39 onto the internal AFP print data format. In the process 40, the data converted in this way are then supplemented with index features that are produced on the basis of application-specific parameters.

Data that already largely conform to the internal AFP data format such as, for example, MO:DCA data are only slightly modified in the normalization processes 41, 42, so that that exactly correspond to the internal AFP data format. The sorting and consolidation process 43 that runs in the second process stage 36 is likewise controlled by external parameters that can be defined either job-specifically or individually directly at the host (main frame).

The processes 44 running in the third process stage 37 for forming an index datafile, 45 for forming the resources datafile and 46 for generating the document from resources data and variable data are controlled with respective parameters supplied from the outside.

In the fourth process stage 38, finally, the index datafile 47, the resources datafile 48 and the document datafile 49 are output, as a result whereof the complete, sorted print data stream is available for the printing.

FIG. 4 shows a processing of print data as already schematically shown in FIG. 3 with more detailed system components. The method and the system components preferably run in the main frame 4 but can also run in some other computer such as, for example, in the print server 8 or in the printer 6.

An incoming print data stream 50 is thereby classified according to a primary data stream 51 that can contain variable print data 52 (print report data) and integrated resources data 53 (inline resources). The incoming data stream 50 can also contain only resources, what are referred to as external resources 54.

The incoming print data as well as job-specific job parameter data 55 are read into the conversion, indexing and sorting system 57 (CIS) via a logical interface 56 (LI). The logical interface 56 thereby acts like a higher-ranking process controller that monitors, enables and, if necessary, blocks various individual processes. To that end, the logical interface 56 comprises a number of sub-modules that are shown at the bottom in FIG. 4, namely a module of process control (threat management, TM), a module for controlling events (event handling, EV), a module for coordinating the memory accesses of different processes (lock management, LK), a memory management module (SM), a non-system-specific interface management module (LM), a module for handling exception states (EX) and a module for controlling status information (trace facility, TR). The logical interface 26 is thereby system-specifically designed, i.e. matched to the higher-ranking operating system such as MVS, BS 2000, UNIX or Windows NT. The other system components shown in FIG. 4 are thereby independent of operating system, so that a simple change from a first operating system to a second operating system is possible by adapting the logical interface 26.

An import routine 58 "im_PdsData" serves for the import of an incoming print data stream, whereby the variable data are read-in in a work process 58*a*, the integrated resources in a process 58*b* and the external resources in a process 58*c*.

The data that have been read in a processed in an input transformation module 59, whereby the variable data 52 are first filtered in a process 59*a*, normalized onto an internal AFP data format in the process 59*b*—controlled by the job-specific parameters 55 offered by the job processor 60—, and, finally, handed over to the page processing unit (page manager) 61.

The job parameters 55 contain the values of all parameters that are required for the normalization, indexing, sorting and conversion of the print data stream. As a result of the process data supplied from the job processor 60 to the input transformation module 59, all information in the system are known that are required for the indexing of the primary data stream—insofar as this is not already indexed at the input side—and that are required for sorting the primary data stream 52.

During the normalizing of the primary data 52 in the process 59*b*, index information that already exist—particularly given primary data that are already present in the AFP print data format—are identified and edited in order to be able to produce a sorting table 63.

During the course of the normalization in the processing step 59*b*, primary data that are not already present in the AFP print data format, for example S/370 line data, are converted into the print data format and index information are inserted into the AFP print data stream in conformity with the parameter values offered by the job processor 60. This indexing information is likewise used later by the page manager 61 for building up the sorting table 63.

During the course of the normalization process 59*b*, a determination is also made regarding which resources are to be allocated to the primary print data stream 52, and a corresponding normalization process for the appertaining resources is started in step 59*b* by means of a message via the resources processing unit 62. Each resource—for example, character sets, watermarks (overlays) or page segments—that is required in the primary data stream thereby effects a normalization process of the corresponding resource. The overall system is thereby designed as a multi-process system, so that both the normalization of the primary data stream as well as the parallel (simultaneous) normalization of a plurality of resource data can ensue. Each required resource dataset is thereby normalized independently of the other resource datasets, namely only respectively once regardless of how often the appertaining data of the resource dataset are needed in the primary data of a print job.

Which external resources 54 (resource data library) are needed for the respective print job can thereby be indicated in the job parameters 55.

The resource data normalized in the process step 59*b* are supplied directly to the AFP conversion process 59*d* by the resource manager 64 and the page manager 61 and are deposited in the resources datafile 48 as finished resources print data stream 71 via the logical interface 56.

The primary data normalized in the step 59b are intermediately stored in a temporary data memory 66 (for example, random access memory, RAM) via the page manager 61, a relocation module 65 and the logical interface 56. The allocated information about the position of the intermediately stored data relative to other data (page, sheet or document) is deposited in the temporary data memory and is additionally deposited in the sorting table 63 as corresponding entry. The page manager thereby assumes a central control and coordination task for the allocation, intermediate storage and sorting of the primary, variable data.

The sorting according to the criterion of the sorting parameters of the job is then implemented by the sorting module 67 upon application of the sorting table 63 and the mediation of the page manager 61.

The variable data can be found in a simple way via the entries in the sorting table after the sorting procedure has been implemented.

The sorting process in the sorting module only starts after all variable data of the primary data stream 52 belonging to a print job have been normalized and all resources data required for the print job have been correspondingly processed. At this time, all resources data are already deposited in the resources datafile 48 and all variable print data in the intermediate memory 66.

The sorting process in the sorting module 67 can be implemented as memory-immanent table sorting procedure within the sorting table 63. The new sorting sequence is defined by the sorting algorithm and by the contents of the index entries. The variable print data deposited in the intermediate memory 66 can thus remain completely untouched during the sorting process.

As soon as the sorting event has ended, the page manager 61 fetches the print data from the intermediate memory 66, whereby the fetch sequence is implemented on the basis of the new sorting sequence in the sorting table 63. In these way, pages, sheets and documents are fetched from the intermediate memory 66 corresponding to the new sorting sequence [and] forwarded by the page manager 61 to the conversion unit 59d for generating the output print data stream 72 and for deposit in the document datafile 49. Finally, the page manager 61 also generates a new index data stream 70 from the sorting table 63 and deposits this in the index datafile 47. Offset values and offset locations of the index data in the index datafile 47 correspond to the offset values and offset locations of the data in the document datafile 49.

Returning to FIGS. 3 and 4, it can again be stated that the first process stage 35 was realized in the processes 59b and 59c. The second process stage 36 is realized in the sorting unit 67, the third process stage 37 is realized in the output conversion process 59d, and the fourth process stage 38 in the datafiles 47, 48 and 49 shown in FIG. 4.

The normalization of the primary data stream 52 ensues in the processes 58a, 59b; the normalization of the resources data ensues in the processes 58b, 58c and 59c; and the sorting, output conversion as well as data generation of the primary data stream ensues [sic] in the components 61, 65, 67, 59d and 72. The index datafile 47, the resources datafile 48 and/or the document datafile 38 can, in particular, be used in browser applications and archiving systems for searching and/or storing data.

Two different sorting methods that can be implemented with the above-described systems shall now be described with reference to FIGS. 5 and 6. An initial document 80 is thereby re-sorted in FIG. 5 according to a layout sorting sequence, whereby the rule $$1,n,2,(n-1),3,(n-2),\tag{Rule 1}$$

applies. The sheets 81 through 89 were thereby re-sorted such that the document 90 derives after the sorting. The sorting sequence shown in FIG. 5 is useful particularly in the production of brochures with a zig-zag fold. Other folding possibilities are disclosed, for example, by WO-A1-00/68877, whose content relating to folding possibilities for signatures is herewith incorporated by reference into the present specification. An example for producing a signature by re-sorting shall be explained in greater detail below on the basis of FIG. 8.

An alternative rule, "sorting according to according to [sic] content", Rule 2, can be seen in FIG. 6. The sorting thereby ensues according to zip code, street and/or name. Sheets that were designated as a unit in the input document 80—the sheets 81 through 84 as well as the sheets 85 and 86 and the sheets 87 through 89 here—are re-sorted such here that they are ordered in the output data stream in the sequence 87-88-89 (first document) for the addressee name "Allan Johnson" and, further, 81-82-83-84 (second document) for the addressee name "Mary Johnson" and, finally pages 85 and 86 (third document) for the addressee name "Mike Newman".

The system illustrated in FIG. 7 corresponds to the system shown in FIG. 4, whereby a function unit 95 intervenes here between the page manager 91 and the output conversion unit 49d, additional information that were previously not contained in the data stream being capable of being added in the output print data stream with the assistance of said function unit 95. This function unit can be optionally called, i.e. that following additional information can be inserted dependent of the given job parameters:

specific AFP-specific information that further improve the data flow;

customer-specific information (data inserter) such as barcode inserter (BCOCA), color attributes (PTOCA) or texts.

FIG. 8 shows how a data stream 91 that comprises 16 pages in ordered sequence (ascending page numbers 1, 2, 3, 4, 5 . . . ) is re-sorted for producing a brochure (booklet) 96. To that end, the input data stream 91 is re-sorted to what is referred to as a 4up booklet data stream 93 in what is referred to as a 4up booklet sorting in a processing step 93. The page sequence then reads page 2, page 4, page 15, etc. (see FIG. 8).

The 4up booklet data stream can then be printed on a recording medium (for example, on paper) on a printer device in what is referred to as a 4up printing event 94 with modulo 8-page production. Respectively two pages are thereby printed next to one another on the front side and on the back side of a web-shaped recording medium 97 (for example, what is referred to as fanfold paper). For example, the pages 3 and 1 then lie next to one another on the front side 97a of the fanfold paper 97, followed by the pages 14 and 16 on the front side 97a. With respect to page 3, the page 14 is printed on the back side 97b, and page 2 is printed on the back side of page 1, etc. In FIG. 8, the page numbers of the pages printed on the back side are thereby respectively indicated in brackets.

Subsequently, the fanfold paper is cut such to form signatures 95 that respectively four pages (two on the front side 97a and two on the back side 97b) lie on a signature. The signatures 95 are then placed on top of one another in the print sequence and bound to form a brochure. Corresponding to the printed page sequence or, respectively, sheet sequence, the original page sequence (page 1, page 2, page 3, ...) thereby derives again in the brochure 96.

The 4up booklet printing method is suited, for example, for producing DIN A5 brochures when the printing ensues on DIN A3 wide paper (fanfold or single sheets, what is referred to as cut-sheet paper).

Exemplary embodiments of the invention were described. It is thereby clear that a person skilled in the art can recite developments and modifications of the invention without further ado. For example, new, additional or different types of sorting criteria can be specified without further ado, as can details of the input, querying or presentation of sorting criteria.

For example, an additional sorting criterion could provide combining the properties of a content sorting and of a layout sorting. For example, a content sorting according to Rule 2 could first ensue according to zip code and name, followed by a layout sorting according to Rule 1 for a brochure within the document of a customer (name).

Further, it is conceivable to employ index particulars such as IELs (index elements) or TLEs (tag logical entry) already present in an AFP data stream for the inventive re-sorting.

The invention is especially suited for being realized as a computer program (software). It can thus be disseminated as computer program module, as datafile on a data carrier like a diskette or CD-ROM or as a datafile via a data or, respectively, communication network. Such and comparable computer program products or computer program elements are developments of the invention. The inventive execution can be employed in a computer, in a printer device or in a printing system with preceding or following data processing devices. It is thereby clear that corresponding computers on which the invention is applied can contain further, known technical devices like input means (keyboard, mouse, touch screen), a microprocessor, a data or, respectively, control bus, a display device (monitor, display) as well as a main memory, a hard disk store and a network card.

LIST OF REFERENCE CHARACTERS 1 printing system
2 main data network
3 client terminal
3a second picture screen
4 main computer
4a first picture screen
5 first tape reader device
6 first printer
7 second printer
8 print server
8a third picture screen
9 archive server
10 second tape reader device
11 first network connection
12 second network connection
13 third printer
14 fourth printer
14a fifth picture screen
15 second network
20 D-print
21 spooler
22 Unix application
23 third application
24 BS2000 application
25 X-print
26 SPS
27 SPS library
28 SLE
29 FGL
30 OFM
31 translib dialogue
32 SPSERVE
33 SPDOL parameter datafile
35 first process stage
36 second process stage
37 third process stage
38 fourth process stage
39 first conversion process
41 normalization process for inline data
42 normalization process for resource library data
43 sorting process
44 process for forming the index datafile
45 process for generating the resource datafile
46 process for generating the document datafile
47 index datafile
48 resource datafile
49 document datafile
50 print data stream
51 primary data stream
52 variable print data
53 inline resource data
54 external resource data
55 job parameter data
56 logical interface
57 conversion-indexing-sorting system
58 import module
59 input transformation module
60 job processor
61 page manager
62 resource processing unit
63 sorting table
64 resource manager
65 relocation module 65
66 temporary data store
67 sorting module
70 output control module for index data
71 output control module for resource data
72 output control module for variable data
80 document before sorting
81-89 sheets of the document
93 90 document after sorting
91 input data stream
92 re-sorting 4up booklet data stream
94 4up printing event
95 data enrichment module
95a signatures
96 brochure
97 fanfold paper
97a front side
97b back side

The invention claimed is:

1. A method for processing a print data stream, comprising the steps of:
   a) converting the print data stream from a first print data format into a normed second print data format, said normed second print data format being a uniform data format;
   b) indexing the print data stream in the normed second print data format to form an indexed print data stream;
   c) sorting the indexed print data stream by predetermined sorting parameters to provide a sorted print data stream in which a sequence of data of the print data stream is changed, said sorting being one of layout sorting and content sorting, the layout sorting changing a sequence of pages of the print data stream and the content sorting changing a sequence of content of the print data stream; and d) outputting the sorted print data stream.

2. A method according to claim 1, further comprising the step of:
dividing the print data stream in at least the normed print data format document-by-document into variable data and resource data.

3. A method according to claim 2, wherein said resource data comprise inline resources that are contained in at least one of an incoming print data stream and external resources.

4. A method according to claim 2, further comprising the steps of:
processing said variable data in a first process unit, and
processing the resource data in a second process unit separate from the first process unit.

5. A method as claimed in claim 4, wherein said first process unit is an AFP document normalizer and said second process unit is an AFP resource normalizer.

6. A method according to claim 2, further comprising the steps of:
carrying out a check first in an indexing unit as to whether the variable data is already indexed, and
given non-indexed data, undertaking an indexing according to the sorting parameters.

7. A method as claimed in claim 6, wherein said indexing unit is a page manager.

8. A method according to claim 2, further comprising the steps of:
sorting the variable data according to said predetermined sorting parameters in a sorting unit.

9. A method as claimed in claim 8, wherein said sorting unit includes at least one of a page manager and a sorter plug-in.

10. A method according to claim 8, further comprising the steps of:
carrying out a check first in an indexing unit as to whether the variable data is already indexed;
given non-indexed data, undertaking an indexing according to the sorting parameters; and
wherein said sorting step ensues in a print production process adapted to production steps after a printing step.

11. A method according to claim 10, further comprising the step of: storing said variable data in an intermediate memory.

12. A method as claimed in claim 11, wherein said variable data is stored as a work dataset.

13. A method according to claim 1, further comprising the step of:
prescribing said predetermined sorting parameters as print job parameters.

14. A method according to claim 1, further comprising the step of:
selecting a parameter value for sorting according to one of said layout sorting and said content sorting.

15. A method according to claim 14, further comprising the step of:
reciting additional detail parameters for specifying the sorting sequence of the print data following selection of a sorting parameter value.

16. A method as claimed in claim 15, wherein said additional detail parameters include at least one of zig-zag folding and zip code, and wherein said print data includes at least one of pages and job data.

17. A method according to claim 1, further comprising the step of:
outputting the sorted print data stream in a predetermined print data format.

18. A method as claimed in claim 17, wherein said predetermined print data format is Advanced Function Presentation format.

19. A method as claimed in claim 1, wherein said first print data format includes at least one of S/370 and MO:DCA and line data, and said second data format is at least one of normalized data and AFP.

20. A method as claimed in claim 1, wherein said step of indexing generates an index file.

21. A computer-readable medium encoded with a computer program as a data structure for processing a print data stream, said computer program when loaded into a computer being operable to implement the method comprising the steps of:

a) converting the print data stream from a first print data format into a normed second print data format having a normalized uniform format;

b) indexing the print data stream in the normed second print data format;

c) sorting the indexed print data stream by predetermined sorting parameters to provide a sorted print data stream in which a sequence of data of the print data stream is changed, said sorting being one of layout sorting and content sorting, said layout sorting changing a sequence of pages of the print data stream, and said content sorting changing a sequence of content of the print data stream; and d) outputting the sorted print data stream.

22. A computer-readable medium according to claim 21, wherein the computer program components implement a method having the step of: dividing the print data stream in at least the normed print data format document-by-document into variable data and resource data.

* * * * *